No. 878,458. PATENTED FEB. 4, 1908.
J. A. FIRSCHING.
FRICTION CLUTCH DRIVING MECHANISM.
APPLICATION FILED MAY 17, 1907.
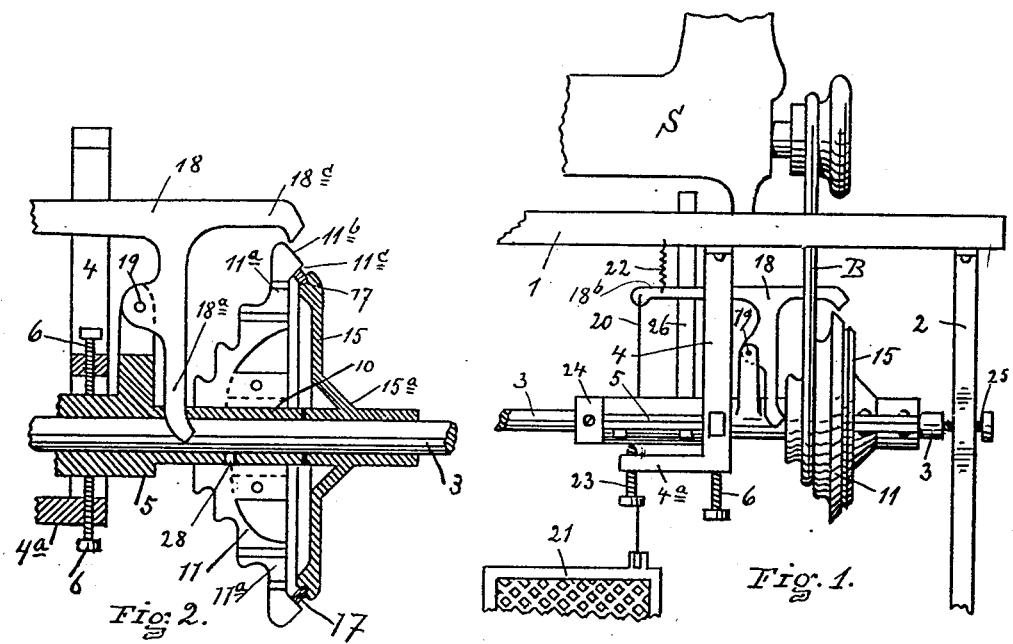
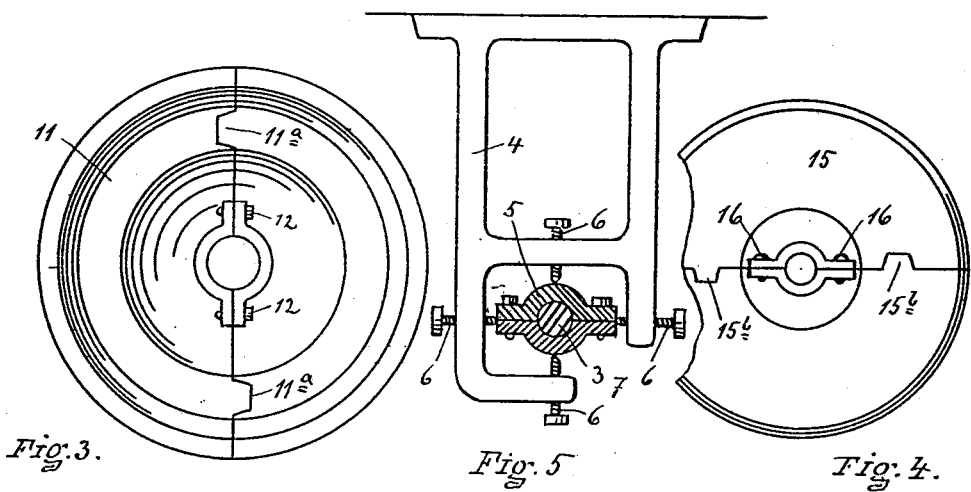
WITNESSES
Rich. A. George
E. S. Hesse
INVENTOR
JOSEPH A. FIRSCHING
By Robinson, Martin & Jones
ATTORNEYS.

UNITED STATES PATENT OFFICE.

JOSEPH A. FIRSCHING, OF UTICA, NEW YORK.

FRICTION-CLUTCH DRIVING MECHANISM.

No. 878,458.  Specification of Letters Patent.  Patented Feb. 4, 1908.

Application filed May 17, 1907. Serial No. 374,128.

*To all whom it may concern:*

Be it known that I, JOSEPH A. FIRSCHING, of Utica, in the county of Oneida and State of New York, have invented certain new and useful Improvements in Friction - Clutch Driving Mechanism; and I do hereby declare that the following is a full, clear, and exact description thereof, which will enable others skilled in the art to which it appertains to make and use the same, reference being had to the accompanying drawings, and to the letters of reference marked thereon, which form part of this specification.

The object of my present invention is to provide a friction clutch drive mechanism particularly adapted for use with power driven sewing machines, and which is simple in construction and adapted to be applied to the shaft and machine table or removed without taking down the shaft, and in which friction is reduced so as to entail a minimum loss of power incident to the drive mechanism and simple and efficient means provided for throwing the clutch out and applying friction to stop the driving mechanism.

Figure 1 shows in side elevation a small portion of the sewing machine table with a portion of the sewing machine mounted thereon and a shaft with my improved friction clutch drive mechanism mounted in position under the table. Fig. 2 shows on an enlarged scale partially in section and partially on parting lines details of the construction. Fig. 3 shows what may be be termed a face view of the friction pulley employed in the construction. Fig. 4 is an outside view of a friction disk or plate employed in the construction. Fig. 5 is a detail of a shaft hanger in connection with a cross section of the shaft and shaft bearing box.

In factories and shops sewing machines are usually mounted on long tables usually in two rows facing opposite sides of the table. A section of such a table is shown in the drawings and indicated at 1. These tables are mounted on stands situated at suitable intervals along the table, one of which is indicated in the drawings by 2. Under the table and well in towards the middle and extending longitudinally of the table will preferably be provided two parallel driving shafts, one of which is indicated in the drawing at 3, although one such shaft may be employed instead of two if preferred or whenever desired. A section of the sewing machine mounted on top of the table is indicated at S. At each machine there will be bolted to the underside of the table a hanger 4. This hanger is adapted to receive the bearing box 5, the same being adjustably supported by set screws 6, 6, 6, 6, which engage the box from the top and bottom and opposite sides and enable the box to be lined up to and with the correct position of the shaft 3. The shaft 3 may be supported entirely in the box 5 or any of these with additional bearings if desired. The hanger 4 is preferably provided with an open side as indicated at 7 whereby it can be placed after the shaft 3 is in position or removed without displacing the shaft. The box 5 is made in upper and lower sections as shown, secured together by bolts whereby it is adapted to be applied and removed from the shaft without displacing the shaft.

On one end the bearing 5 is made circular to provide an external bearing surface as indicated at 10. On this bearing is mounted for rotation a pulley 11 preferably having three sets of grooves to receive a round driving belt as B such as ordinarily employed in driving sewing machines. The pulley 11 is made in two sections as shown in Fig. 3 adapting it to be placed around the shaft without displacing the shaft and take its position on the bearing 10. The two parts of the pulley 11 are preferably provided with interlocking tongues and grooves 11$^a$ and are held together by bolts 12. Around its periphery the band pulley 11 is provided with an inclined face 11$^b$ and also another inclined face 11$^c$, the latter being the friction clutch face. A friction disk 15 is provided formed in two parts to adapt it to be applied to the shaft 3 and provided with a sleeve portion 15$^a$ and bolts 16 whereby it may be clamped on the shaft firmly, so as to rotate with the shaft 3 positively. Around its periphery in a suitable groove the friction disk 15 is provided with a leather facing 17 adapted to engage with the friction face 11$^c$ of the pulley 11. For shifting the pulley 11 laterally on the bearing 10 into and out of engagement with the friction disk 15 there is provided a bell crank lever 18 pivotally mounted at 19 on a stand or projection provided on the upper section of the bearing box 5. One branch 18$^a$ of the lever 18 is forked at its lower end to straddle the box 5 and is adapted to engage against the end of the pulley 11. To the branch 18$^b$ of the lever 18 there is preferably connected by means of a rod 20 a treadle 21 located on the floor in a suitable convenient position for the operator. When the lever 18 is operated by means of the treadle it will force the band pulley 11 to the right, as same is shown in Figs. 1 and 2, and into engagement with the friction disk 15, which will be rotating and barring a preliminary amount of slippage the pulley 11 will take up the speed of the disk 15 and drive the sewing machine by means of the belt B. The necessary lateral movement of the band pulley 11 on the bearing 10 is permitted by swinging the lower portion of the belt B, this movement being but trifling at the most. For throwing the clutch out or discontinuing the same there is provided on the lever 18 a finger 18ᶜ which overhangs the inclined face 11ᵇ on the periphery of the pulley and when pressure on the treadle is released the lever 18 is operated to its normal position by the action of spring 22, and in so doing the finger 18ᶜ engages with the inclined face 11ᵇ and forces the band pulley 11 to the left, as same is shown in Figs. 1 and 2, and at the same time serves as a brake to bring the parts promptly to a stop.

It will be noted that the band pulley 11 runs on the exterior of the bearing box on the bearing 10, and when the driving mechanism is thrown into its inoperative position there is nothing running except the shaft 3 and the disk 15, which require substantially no power to drive, and inasmuch as ordinarily the sewing machines are out of operation more of the time than they are in operation this feature is quite important.

In order to counteract the tendency of the tension of the belt B to cant or rock the bearing box 5 in the hanger 4, the hanger is provided with an arm 4ª extending parallel to the shaft 3 and provided in its outer end with a set screw 23 adapted to engage the box 5 at a point quite remote from the set screws 6 and force it upwardly with sufficient pressure to counteract the tension of the belt B. In order to prevent lateral movement of the shaft 3 and resist the pressure of the friction pulley 11 against the disk 15, there may be provided either the collar 24 secured on the shaft 3 and abutting against the end of the box 5, or a center screw 25 provided in one of the stand legs and engaging against the end of the shaft 3. The collar 24 if employed would be a two-pieced interlocking affair which would allow it to be applied to the shaft 3. In order to conveniently oil the bearing 5 there is preferably provided a tube 26 extending from a suitable opening in the upper section of the bearing up through the table 1 in a convenient position for the operator to reach the same and the oil applied to the bearing 5 through the tube 26 will also be utilized for lubricating the bearing 10 on which the band pulley 11 runs by providing an oil hole at 28.

In order to enable the two parts of the friction disk 15 to register more perfectly when applied to the shaft and secured together they will be provided with interlocking ribs 15ᵇ, 15ᵇ.

It will be noted that the tension of the belt B is not taken on the shaft 3 but is taken on the bearing 10, so that when the machine is not running the driving shaft is relieved entirely from tension of the machine belts, which when they are numerous are a matter of considerable importance.

What I claim as new and desire to secure by Letters Patent is:

1. The combination of a driven shaft, a bearing concentric with the shaft, a band pulley mounted on said bearing for rotation and lateral movement and having at its periphery an inclined wedging face and an inclined friction face, a friction disk secured on said shaft and arranged adjacent to said pulley, a lever for forcing the pulley against the friction disk, and means for withdrawing the pulley from the friction disk consisting of a finger engaging said inclined or wedging face on the periphery of the pulley, substantially as set forth.

2. The combination in a friction clutch driving mechanism of a driven shaft, a two-part band pulley mounted on said bearing for rotation and lateral movement and having a friction face and a wedging face at its periphery, a two-part friction disk secured to and rotating with the shaft and arranged in proximity to the said pulley and means for moving the pulley toward and from the friction disk consisting of a bell crank lever having a forked arm engaging the end of the pulley and a finger engaging the wedging face thereof, substantially as set forth.

3. The combination in a driving clutch mechanism of a shaft hanger arranged to be applied to a shaft in position, a separable bearing box adapted to be applied to the shaft in position and placed in the hanger and having an external bearing surface at one side of the hanger, means for adjusting the position and supporting the box in the hanger, a separable pulley arranged to be placed about the shaft and mounted on said bearing surface for rotation and lateral movement and having a friction face, a separable friction disk arranged to be applied to and clamped on the shaft in position, and means for moving the pulley laterally into and out of engagement with the friction disk, substantially as set forth.

In witness whereof, I have affixed my signature, in presence of two witnesses, this 11th day of May 1907.

JOSEPH A. FIRSCHING.

Witnesses:
  GEO. E. RENDELL,
  SARAH E. CLARK.